United States Patent

Waagepetersen

[11] Patent Number: 5,562,014
[45] Date of Patent: Oct. 8, 1996

[54] FLY WHEEL ARRANGEMENT

[75] Inventor: Gaston B. F. Waagepetersen, Helsingør, Denmark

[73] Assignee: Forskningscenter RISØ, Roskilde, Denmark

[21] Appl. No.: 343,481

[22] PCT Filed: May 11, 1993

[86] PCT No.: PCT/DK93/00156

§ 371 Date: Nov. 28, 1994

§ 102(e) Date: Nov. 28, 1994

[87] PCT Pub. No.: WO93/24765

PCT Pub. Date: Dec. 9, 1993

[30] Foreign Application Priority Data

May 27, 1992 [DK] Denmark ............... 0707/92

[51] Int. Cl.$^6$ ........................................ G05G 1/00
[52] U.S. Cl. ............................. 74/572; 74/573 R
[58] Field of Search ............ 74/572–574; 464/180

[56] References Cited

U.S. PATENT DOCUMENTS

| | | | |
|---|---|---|---|
| 4,220,055 | 9/1980 | Dubois et al. | 74/573 R |
| 4,991,462 | 2/1991 | Breslich et al. | 74/572 |
| 5,205,189 | 4/1993 | Wesling et al. | 74/573 R |
| 5,285,700 | 2/1994 | Lau | 74/573 R |

FOREIGN PATENT DOCUMENTS

| | | | |
|---|---|---|---|
| 160637 | 4/1991 | Denmark | 74/572 |
| 63-125841 | 5/1988 | Japan | 74/572 |
| 74010299 | 10/1975 | Sweden | 74/572 |
| 796577 | 1/1981 | U.S.S.R. | 74/572 |
| 1420268 | 8/1988 | U.S.S.R. | 74/573 R |
| 1516664 | 10/1989 | U.S.S.R. | 74/572 |
| 805371 | 12/1958 | United Kingdom | 74/573 R |
| 1403748 | 8/1975 | United Kingdom | 74/572 |

OTHER PUBLICATIONS

Patent Abstract of Japan, vol. 12, No. 374, M–749, Abstract of Japan, A, 63–125841, 30 May 1988.
Derwent's abstract, No. K6307 D/41, week 8141, Abtract of Soviet Union, Patent 796577, 15 Jan. 1981.
Derwent's abstract, No. 90–237286/31, week 9031, Abstract of Soviet Union, Patent 1516664, 23 Oct. 1989.

*Primary Examiner*—Vinh T. Luong
*Attorney, Agent, or Firm*—Hill, Steadman & Simpson

[57] ABSTRACT

A fly wheel arrangement includes a rotatable axle (1), a ring (4) essentially forming the rotating mass of the fly wheel and a connecting member (5) made from fiber-reinforced plastic connecting the ring (4) with the axle (1) or with a part rotating therewith. The connecting member (5) is connected to the ring (4) at its outer end portion and to the axle (1) or a part connected thereto at its inner end portion. The connecting member (5) has essentially the shape of a cylinder or a conical shell

6 Claims, 2 Drawing Sheets

5,562,014

FLY WHEEL ARRANGEMENT

FIELD OF THE INVENTION

The invention relates to a fly wheel arrangement comprising a rotatable axle, a ring essentially forming the rotating mass of the fly wheel and a connecting means having essentially the shape of a cylinder or a conical shell and being made from fibre-reinforced plastics connecting the ring with the axle or with a part rotating therewith, the connecting means being glued to the ring at its outer end portion and to the axle or a part connected hereto at its inner end portion.

BACKGROUND ART

Danish Patent Application DK-B-160.687 discloses a fly wheel, wherein the connecting means has a plate-like, cross-sectional low U shape. The known fly wheel arrangement comprises two or four such connecting means grouped in pairs, each being glued to the ring and a hub wedged on the axle at their inner and outer end portions, respectively. During rotation of the fly wheel the ring generates strong centrifugal forces, and if the fly wheel is placed in moving transport means, such as airplanes or vehicles, the fly wheel arrangement is also subjected to a strong gyroscopic torque. The above mentioned forces in particular make heavy demands on the inner glued joints between the connecting means and the hub. The expansion of the ring produced by the centrifugal forces results in large angular displacements in the connecting means and as a result hereof corresponding high stresses. As indicated above these stresses in particular may cause problems at the inner glued joints with the hub.

Japanese Patent Application JP, A, 63-125841 discloses a fly wheel arrangement having a connection means in the shape of a conical shell which is connected to a ring-shaped rotating mass at its outer end portion and to a hub at its inner end portion.

DISCLOSURE OF THE INVENTION

An object of the present invention is to provide a fly wheel arrangement of the above type, wherein the stresses in the connecting means and in particular in the connection between the connecting means and the axle is reduced in relation to prior art.

The fly wheel arrangement according to the invention is characterised in that the inner glued joint between the axle and the connecting means is arranged at a diameter at least three times the bearing diameter of the axle. As a gyroscopic torque at any point causes forces in the joint which are inversely proportional to the square of the distance of the point from the axis of rotation, the joint may advantageously be placed as far away from the axis of rotation as possible.

According to the invention, the connecting means may comprise fibers following an essentially circumferential path and fibers following a longitudinal path essentially at right angles to the circumferential fibers. The longitudinal fibers are able to absorb the tension and compression caused by the gyroscope torque, and the connecting means may comprise several circumferential fiber layers of varied thickness, fiber content and fiber material, whereby the density and the E-module thereof may be varied in the circumferential direction in such a manner so as to give a desired smooth deflection curve for the longitudinal generatrix. The expansion of a freely rotating ring is determined by the ratio between the density and the E-module, and the connecting means may be considered as composed of a plurality of such rings.

Moreover, according to the invention the axle may comprise a radially projecting disc ending at its outer periphery in an annular body projecting axially at least in one direction. The inner end of the connecting means is glued to the lower face of the annular body. This embodiment is particularly advantageous, as the centrifugal force thus causes pressure to arise in the glued joint.

A proper glued joint may be subjected to approximately the same shear stress in its entire joint area. The annular body on the disc is usually more rigid than the connecting means to be glued herewith. Consequently, the stress in the glue joint increases with the distance from the disc. However, by another embodiment of the invention this may be compensated for by arranging a plastics disc of a cross-sectional wedge shape, and increasing height in the direction away from the annular body, on the lower face of the annular body between the annular body and the connecting means. This plastic material or matrix material preferably having a low or no fiber content, has a lower shear modulus than the two elements between which it is arranged. Consequently, the plastic material ensures that the same shear stress is obtained in the entire glued joint.

BRIEF DESCRIPTION OF THE DRAWINGS

The invention is explained in detail below with reference to the drawings, in which.

BEST MODE FOR CARRYING OUT THE INVENTION

Figure 1:
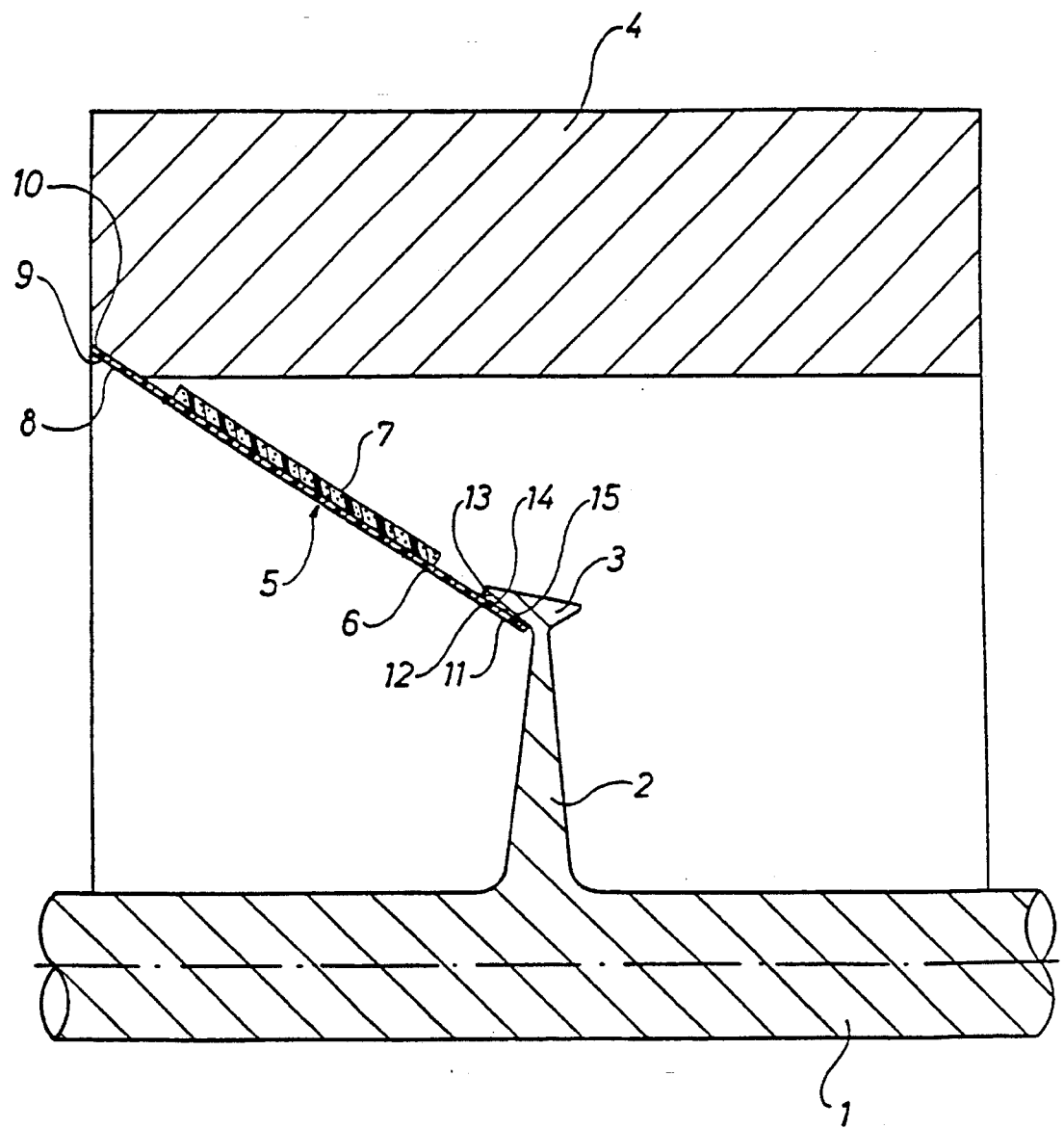
FIG. 1 is an axial, sectional view through a first embodiment of a fly wheel arrangement according to the invention

The preferred embodiment of the fly wheel arrangement shown in FIG. 1 comprises a rotatable axle (1) of steel with an integrally shaped, projecting disc (2) ending in an annular body (3) projecting axially and having a cross-sectional triangular shape. Further, the fly wheel arrangement comprises an annular ring (4) made from fiber-reinforced plastics, preferably from a carbon fiber-reinforced plastics, the annular ring being connected to the annular body (3) on the projecting disc (2) of the rotatable axle (1) by means of a connecting means (5). The connecting means (5) has the shape of a conical shell body and comprises an inner plastics layer (6), in which the fibers are arranged in the longitudinal direction, and an outer layer (7), in which the fibers extend circumferentially essentially at right angles to the longitudinal fibers in the inner plastics layer (6). The inner plastics layer (6) extends further than the outer plastics layer and is glued to a bevel (9) in the ring (4) at its outer end (8) by means of an outer glued joint (10). At its inner end (11) the connecting means (5) is glued to a wedge-shaped plastics disc (13) by means of a first inner glued joint (12), the plastics disc being glued to the lower face (15) of the ring body (3) on the projecting disc (2) of the axle (1) by means of a second inner glued joint (14).

The inner plastics layer (6) comprising longitudinal fibers as well as the outer plastics layer (7) comprising circumferential fibers of the connecting means (5) are dimensioned and arranged in such a manner that during rotation the connecting means (5) deflects in accordance with a smooth deflection curve without too small radii of curvature and resulting unacceptable stresses, when the ring (7) expands due to the centrifugal forces. By arranging the cross-sectionally wedge-shaped plastics ring (13) between the inner end (11) of the connecting means and the lower face of the annular body (3) an even distribution of the shear stresses is ensured in the glued joints (12, 14). The inner glued joints are arranged at a diameter substantially larger than the smallest diameter of the axle or the bearing diameter in order to reduce the stresses in the glued joints.

Figure 2:
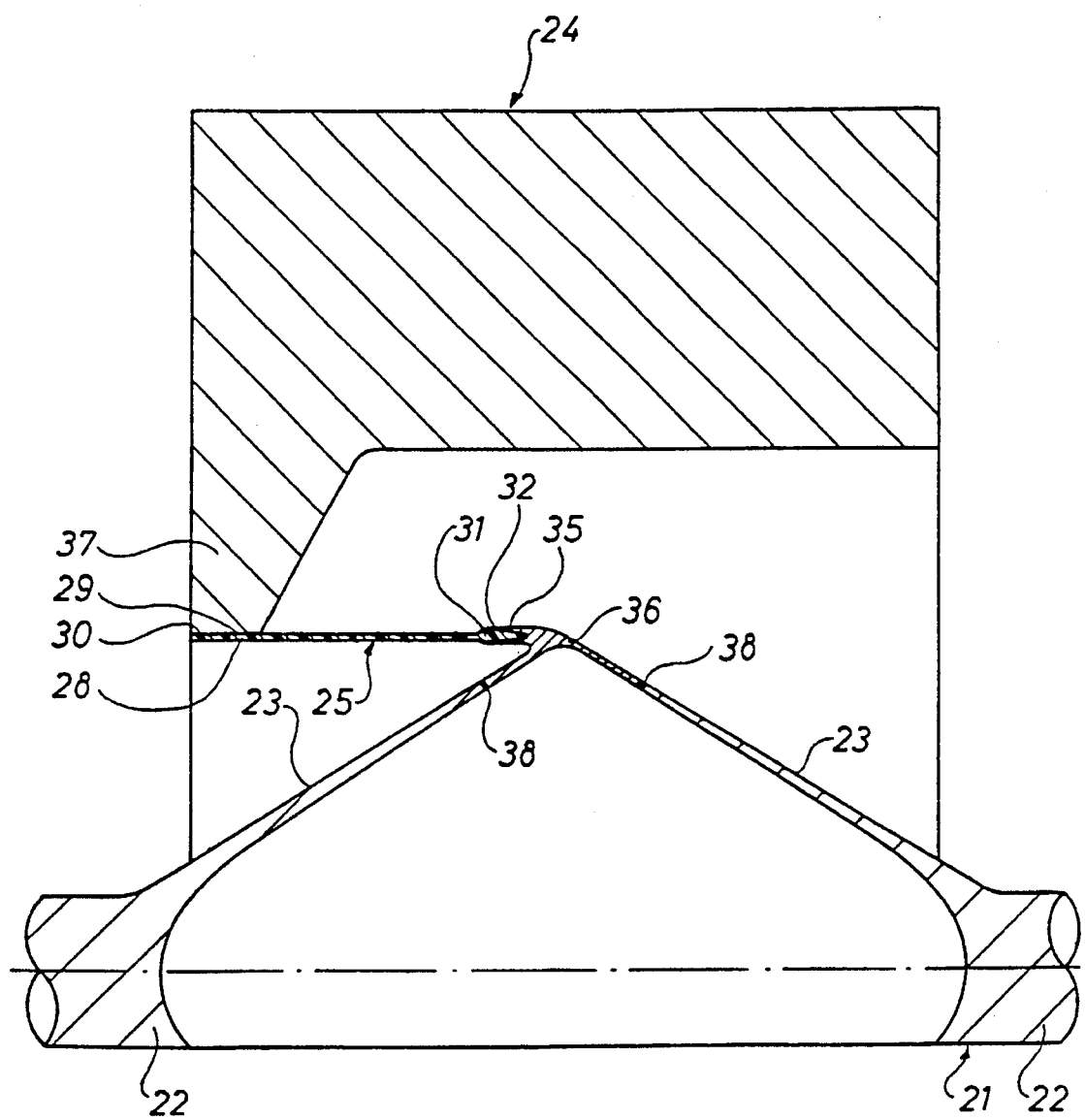
FIG. 2 is an axial, sectional view through an alternative embodiment of the fly wheel arrangement according to the invention.

The alternative embodiment of fly wheel arrangement according to the invention shown in FIG. 2 comprises an axle (21) consisting of two identical axle halfs (22) each having a conically diverging end portion (23) adjacent to their axle ends. At (38) each of the end portions (23) are welded to a corresponding leg of the connecting ring (36) being essentially V-shaped in a cross-sectional view. The axle halfs and the connecting ring are preferably made from aluminium.

The fly wheel arrangement further comprises a ring (24) essentially forming the rotating mass of the fly wheel and having an inner radial projection (37) adjacent to one end, and a connecting means (25) connecting the ring (24) to the axle (21). The connecting means (25) is a cylindrical body of fiber-reinforced plastics and shaped in such a manner that the desired deflection curve is formed with appropriately large radii of curvature. The outer end portion (28) of the connecting means (25) is glued to the inner surface (29) of the inner radial projection (37) of the ring (24) by means of a outer glued joint (30). The inner end portion (31) of the cylindrical connecting means (25) engages a groove (35) formed in the connecting ring (36) and is glued to the groove (35) by means of an inner glued joint (32).

The matrix or basic material in the fiber-reinforced plastics may comprise a plurality of plastics materials, such as polyester, epoxy and PES. Likewise, various different fibers may be used for the fiber-reinforcement, such as glass or carbon fibers depending on the desired strength and bending properties of the connecting means.

Although other modifications and changes may be suggested by those skilled in the art, it is the intention of the inventor to embody within the patent warranted hereon all changes and modifications as reasonably and properly come within the scope of his contribution to the art.

I claim:

1. A fly wheel arrangement, comprising:
   an axle mounted for rotation defining a bearing diameter,
   a ring forming a rotating mass of the fly wheel, and
   a connecting means having a shape of one of a cylinder and a conical shell and being made solely from fiber-reinforced plastic for connecting said ring with said axle,
   a first adhesive bond gluing said connecting means to said ring at its outer end portion and
   a second adhesive bond gluing said connecting means to said axle at its inner end portion to form an inner glued joint, the inner glued joint between said axle and said connecting means being at a diameter at least three times the bearing diameter of said axle.

2. A fly wheel arrangement as claimed in claim 1, wherein said connecting means comprises fibers following a substantially circumferential course as well as fibers following a substantially longitudinal course at substantially right angles to the circumferential course.

3. A fly wheel arrangement according to claim 1, wherein said axle comprises a radially projecting disc ending at its outer periphery in an annular body projecting axially at least in one direction, and said inner end portion of said connecting means being glued to a lower face of said annular body.

4. A fly wheel arrangement as claimed in claim 1, further comprising:
   a disc formed on said axle to rotate with said axle, said connecting means having said inner end portion glued to said disc.

5. A fly wheel arrangement as claimed in claim 1, wherein said inner end portion of said connecting means is glued directly to said rotatable axle.

6. A fly wheel arrangement comprising:
   an axle mounted for rotation and defining a bearing diameter,
   a ring forming a rotating mass of the fly wheel,
   a connecting means having a shape of one of a cylinder and a conical shell and being made from fiber-reinforced plastic for connecting said ring with said axle, said connecting means being glued to said ring at its outer end portion and to said axle at its inner end portion to form an inner glued joint, the inner glued joint between said axle and said connecting means being at a diameter at least three times the bearing diameter of said axle,
   said axle comprises a radially projecting disc ending at its outer periphery in an annular body projecting axially at least in one direction, and said inner end portion of said connecting means being glued to a lower face of said annular body, and
   a plastic disc of a cross-sectional wedge shape and increasing height in a direction away from said annular body arranged on the lower face of said annular body between said annular body and said connecting means.

\* \* \* \* \*